United States Patent [19]
Kakinami et al.

[11] Patent Number: 5,321,255
[45] Date of Patent: Jun. 14, 1994

[54] OBSTACLE DETECTING SYSTEM HAVING A PLURALITY OF SPACED LASER DIODES

[75] Inventors: Toshiaki Kakinami; Kunihiko Soshi, both of Ibaraki, Japan

[73] Assignee: Aisin Seiki Kabushiki Kaisha, Kariya, Japan

[21] Appl. No.: 951,823

[22] Filed: Sep. 28, 1992

[30] Foreign Application Priority Data

Sep. 30, 1991 [JP] Japan .................. 3-252342

[51] Int. Cl.⁵ .......................... G01B 11/24
[52] U.S. Cl. .................. 250/222.1; 250/561; 340/903
[58] Field of Search .......... 250/221, 222.1, 561, 250/235, 236; 340/901–904, 555–557; 359/209

[56] References Cited

U.S. PATENT DOCUMENTS

| | | | |
|---|---|---|---|
| 2,783,450 | 2/1957 | Jackson | 340/904 |
| 3,152,317 | 10/1964 | Mayer | 340/903 |
| 3,921,749 | 11/1975 | Kawada | 180/98 |
| 4,558,215 | 10/1985 | Kaneko et al. | 250/222.1 |
| 5,026,153 | 10/1991 | Suzuki et al. | 340/903 |

FOREIGN PATENT DOCUMENTS

1-114550  5/1989  Japan .
2-216080  8/1990  Japan .

*Primary Examiner*—David C. Nelms
*Assistant Examiner*—Stephone B. Allen
*Attorney, Agent, or Firm*—Banner, Birch, McKie & Beckett

[57] ABSTRACT

An obstacle detecting system comprises an optical unit having a plurality of spaced laser diodes each of which emits a laser beam, a convex lens spaced from the optical unit in the frontward direction thereof and establishing a combined beam after each the laser beam passes through the convex lens, and a driving device for adjusting the relationship between each the laser beam and the convex lens. Such structure enabling the detection of the obstacle such as a vehicle in such manner that the obstacle is fallen within the width of the combined beam by adjusting the relationship between each the laser beam and the convex lens.

15 Claims, 9 Drawing Sheets

OBSTACLE DETECTING SYSTEM HAVING A PLURALITY OF SPACED LASER DIODES

BACKGROUND OF THE INVENTION

The present invention relates to an obstacle detecting system, and in particular to an obstacle detecting system which is mounted on a vehicle for detecting an obstacle at a frontward direction thereof by using a radar principle.

Conventional obstacle detecting systems of the type are disclosed in Japanese Patent Laid-open Print No. Hei 1-114550 published in May 8, 1989, and Japanese Patent Laid-open Print No. Hei 2-216080 published in Aug. 28, 1990. In each of the conventional systems, a radio wave of an ultrahigh frequency is emitted from a following vehicle to a preceeding vehicle as an obstacle. If the wave is found to be the reflection from the preceeding vehicle, the resulting recognition is used for controlling the inter-vehicle distance.

However, in each of the conventional systems, since the beam of the radio wave is narrow in width or the lateral length direction of the vehicle, if the preceeding vehicle is moved in a direction which is substantially perpendicular to the cruising direction of the following vehicle, the chasing of the preceeding vehicle may be in malfunction.

SUMMARY OF THE INVENTION

It is, therefore, a primary object of the present invention to provide an obstacle detecting system which ensures the reliable chasing of an obstacle such as a preceeding vehicle.

In order to attain the foregoing object, an obstacle detecting system comprises an optical unit having a plurality of spaced laser diodes each of which emits a laser beam, a convex lens spaced from the optical unit in the frontward direction thereof and establishing a combined beam after each the laser beam passes through the convex lens, and driving means for adjusting the relationship between each of the laser beams and the convex lens.

BRIEF DESCRIPTION OF THE DRAWINGS

The above and other objects, features and advantages of the present invention will be more apparent and more readily appreciated from the following detailed description of preferred exemplarily embodiment of the present invention, taken in connection with the accompanying drawings, in which.

DESCRIPTION OF THE PREFERRED EMBODIMENTS

Embodiments of the present invention will be described hereinunder in detail with reference to the accompanying drawings.

Figure 1:
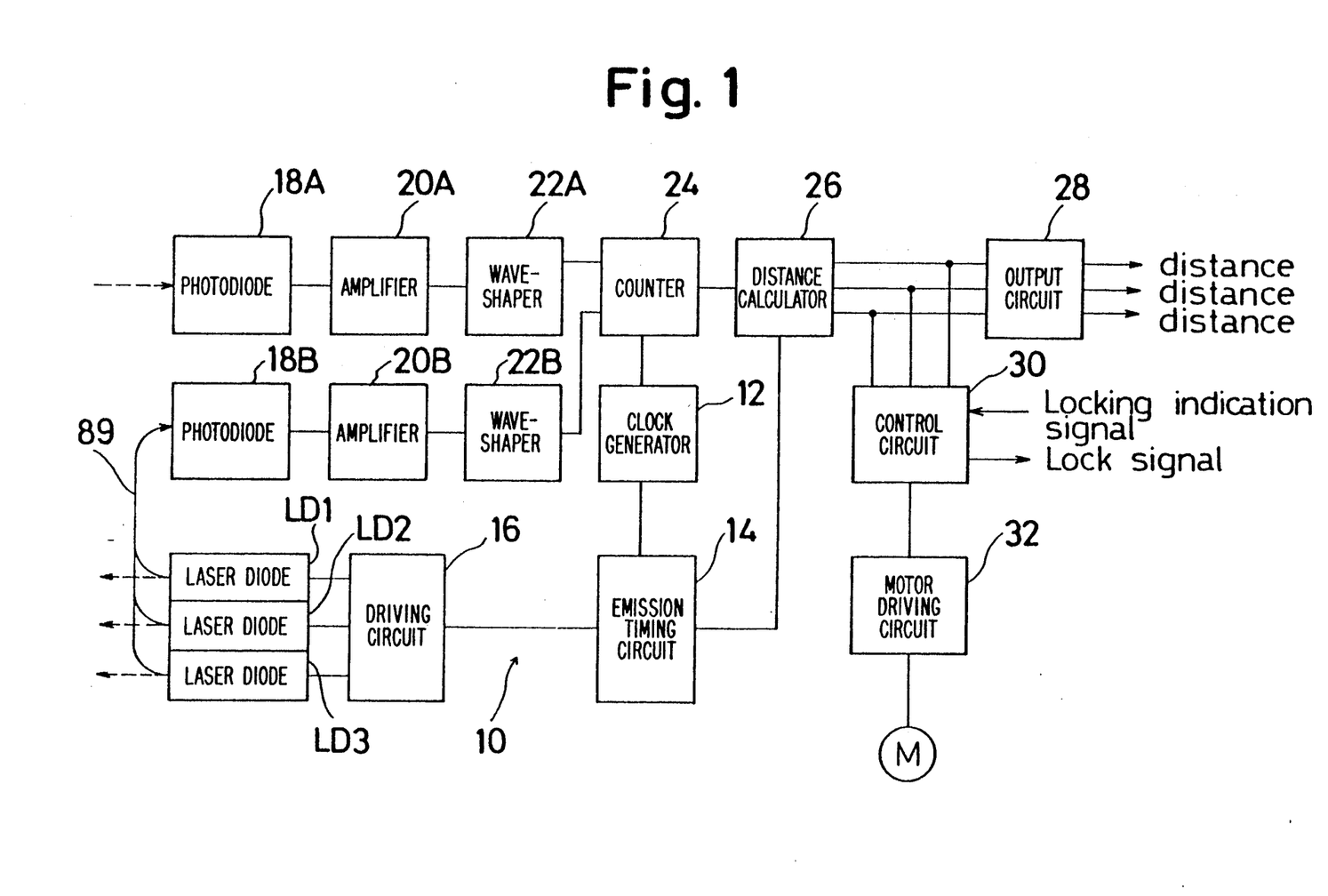
FIG. 1 is a block diagram showing an overall structure of an obstacle detecting system according to the present invention.

Referring first to FIG. 1, a block diagram of an overall structure of an obstacle detecting system 10 is shown. This obstacle system 10 has a first laser diode LD1, a second laser diode LD2, and a third laser diode LD3 which are under the control of a driving circuit 16. The laser diodes LD1, LD2, and LD3 are set to emit laser beams in turn at intervals towards an obstacle 90. Emission timing circuit 14 controls driving circuit 16 upon receipt of a signal from clock generator 12. A part of each emitted laser beams is fed via a common optical fiber 89 to a photodiode 18B, is amplified at amplifier 20B, is wave-shaped at a wave-shaper 22B, and is fed as an emission timing signal to a counter 24. The counter 24 is set to start upon receipt of the emission timing signal. The counter 24 is also fed from a clock generator 12 with a clock signal for measuring a time necessary for the emitted laser beam to go and return back.

A reflected laser beam or the emitted laser beam after its reflection at the obstacle 90 is set to be received at another photodiode 18A. The resulting laser beam is amplified at an amplifier 20A, is wave-shaped at a wave-shaper 22A, and is fed to the counter 24 as a receipt time signal. The counter 24 is set to be terminated upon receipt of the receipt time signal. Due to the fact that the value in the counter 24 indicates the time required for the laser beam's reflection movement, the value is fed to a distance calculator 26 so as to be converted into the corresponding distance between the vehicle and the obstacle 90, and the resulting distance is displayed at an output circuit 28 including a CRT (not shown) or an instrument (not shown).

The interval $\Delta t$ between two successive laser beam emissions is determined on the basis of the following principle. That is to say, if the maximum measuring distance is set to be 200 m, the time taken for each laser beam to establish its reflection movement can be obtained by the calculation of $(200 \text{ m} \times 2) \div (3 \times 10^8 \text{ m/s}) = 1.3 \mu$ sec. Thus, when the interval $\Delta t$ is set to be above 1.3 $\mu$ sec, an identification of each laser beam can be established at the photodiode 18A.

Figure 2:
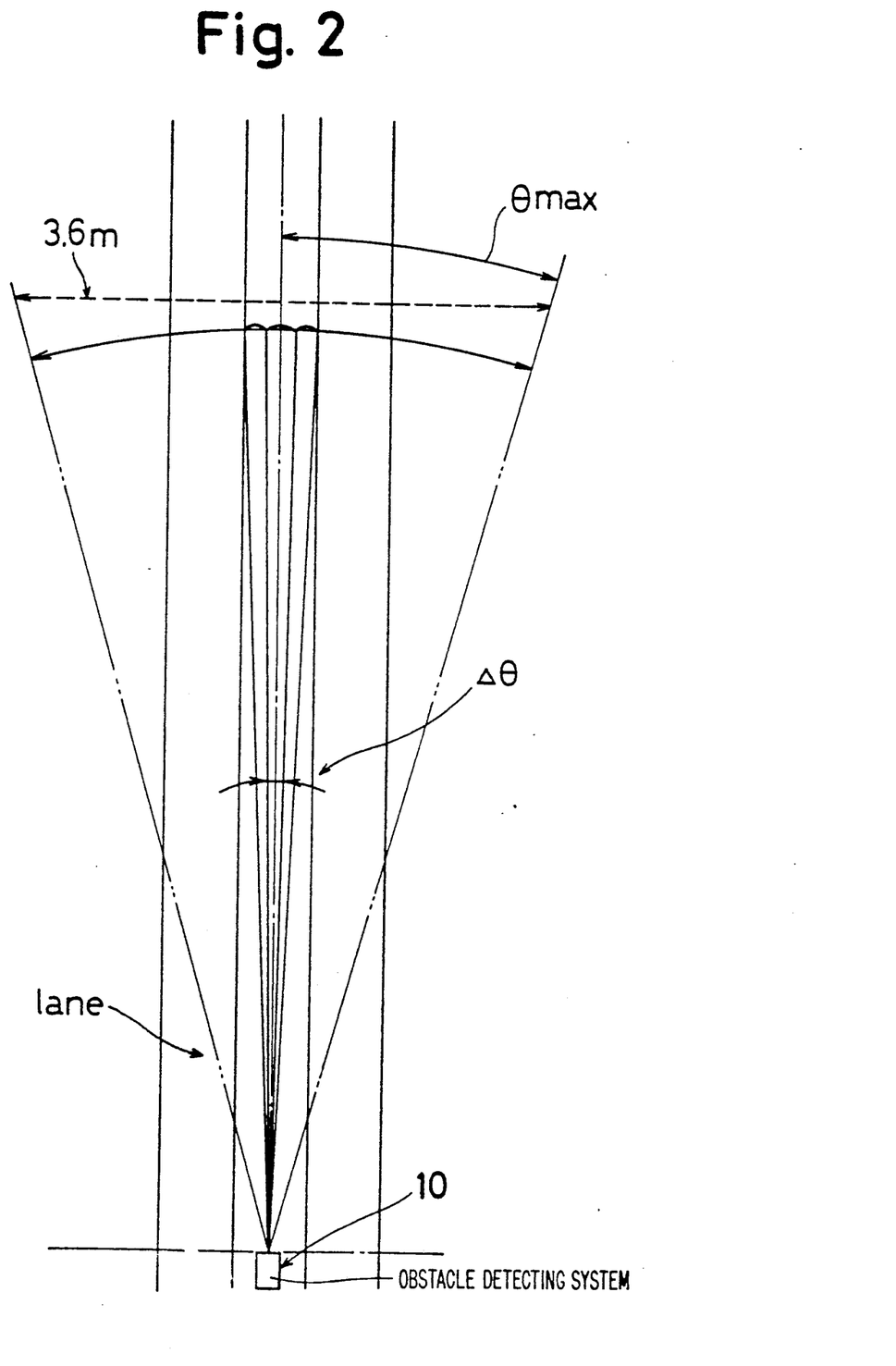
FIG. 2 is a plane view showing a scanning manner of laser beams.

A control circuit 30 controls a motor driving circuit 32 in order to adjust the rotation of a motor M on the basis of the distance corresponding to each laser beam. In this system 10, as shown in FIG. 2, the three laser beams which constitute a combined laser beam as a whole cover a total of 3.6 m wide emission range at a 100 m distance ahead, and if the vehicle is of 1.7 m width each beam can detects the obstacle 90. If the obstacle 90 in the form of the preceeding vehicle traverses the cruising direction of the following vehicle (hereinafter referred to this vehicle) on which this system is mounted, the detected conditions of the obstacle 90 by the system 10 are summarized in the following Table 1.

TABLE 1

| Mode | LD3 | LD2 | LD1 | Condition of the obstacle |
|---|---|---|---|---|
| 1 | X | X | X | No obstacle is detected. |
| 2 | X | X | O | At front-right side relative to this vehicle |
| 3 | X | O | X | In alignment with this vehicle |
| 4 | X | O | O | Inclination toward front-right side |
| 5 | O | X | X | At front-left side relative to this vehicle |
| 6 | O | X | O | In alignment with this vehichle |
| 7 | O | O | X | Inclination toward front-left side |
| 8 | O | O | O | In alignment with this vehicle |

O : The obstacle is detected.
X : No obstacle is detected.

Figure 3:
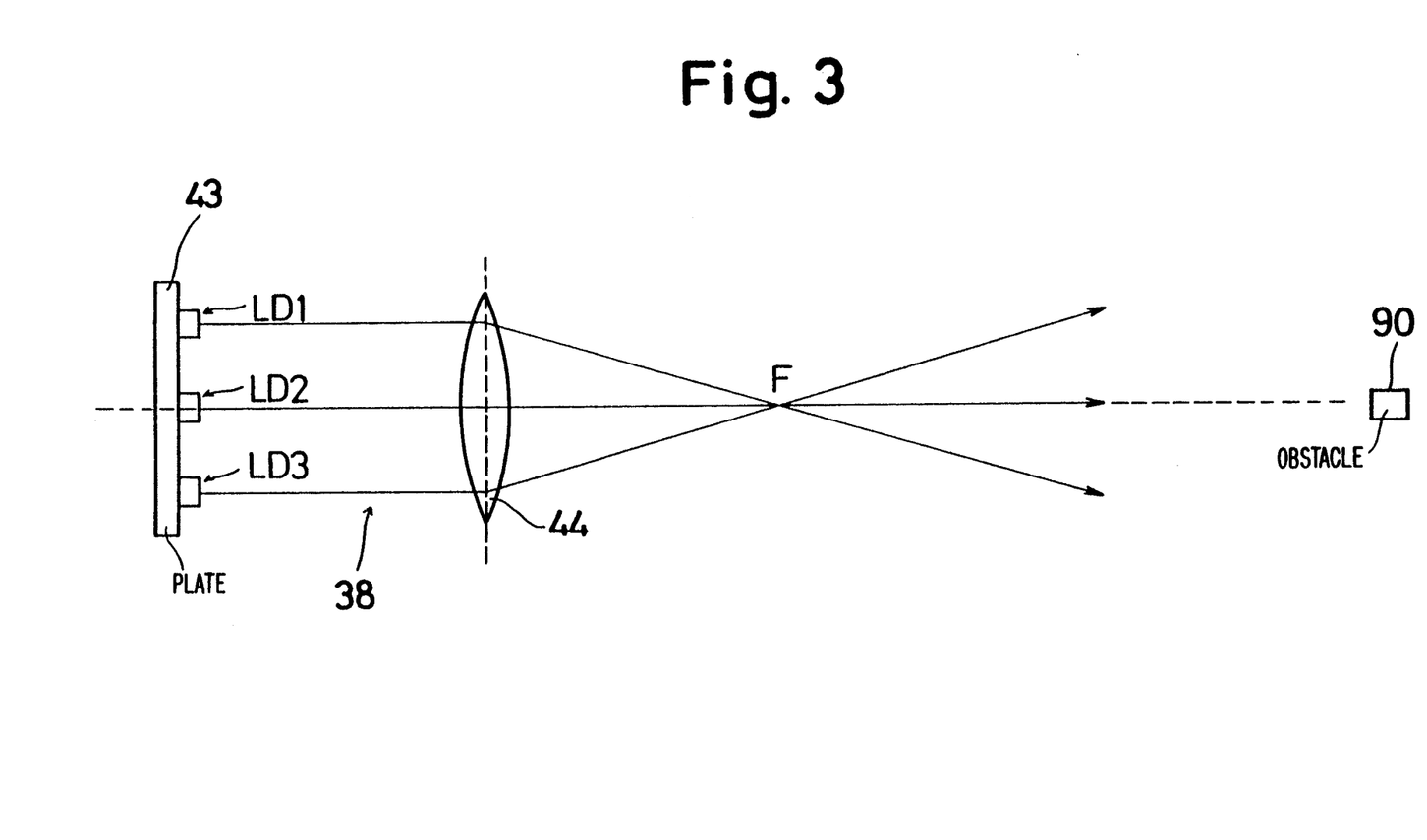
FIG. 3 is a plane view showing three laser beams pass a common convex lens.
Figure 5:
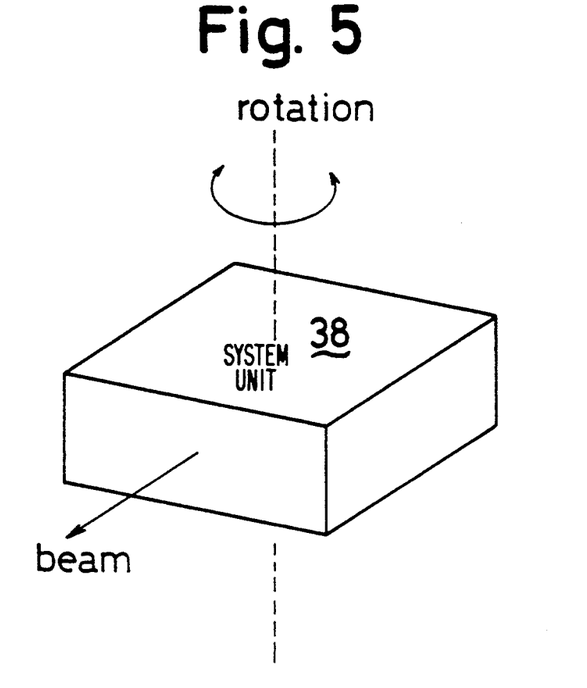
FIG. 5 is a view showing the relationsihip between a prime axis of a laser beam emission direction and a rotational direction of a system driven by a motor.
Figure 6:
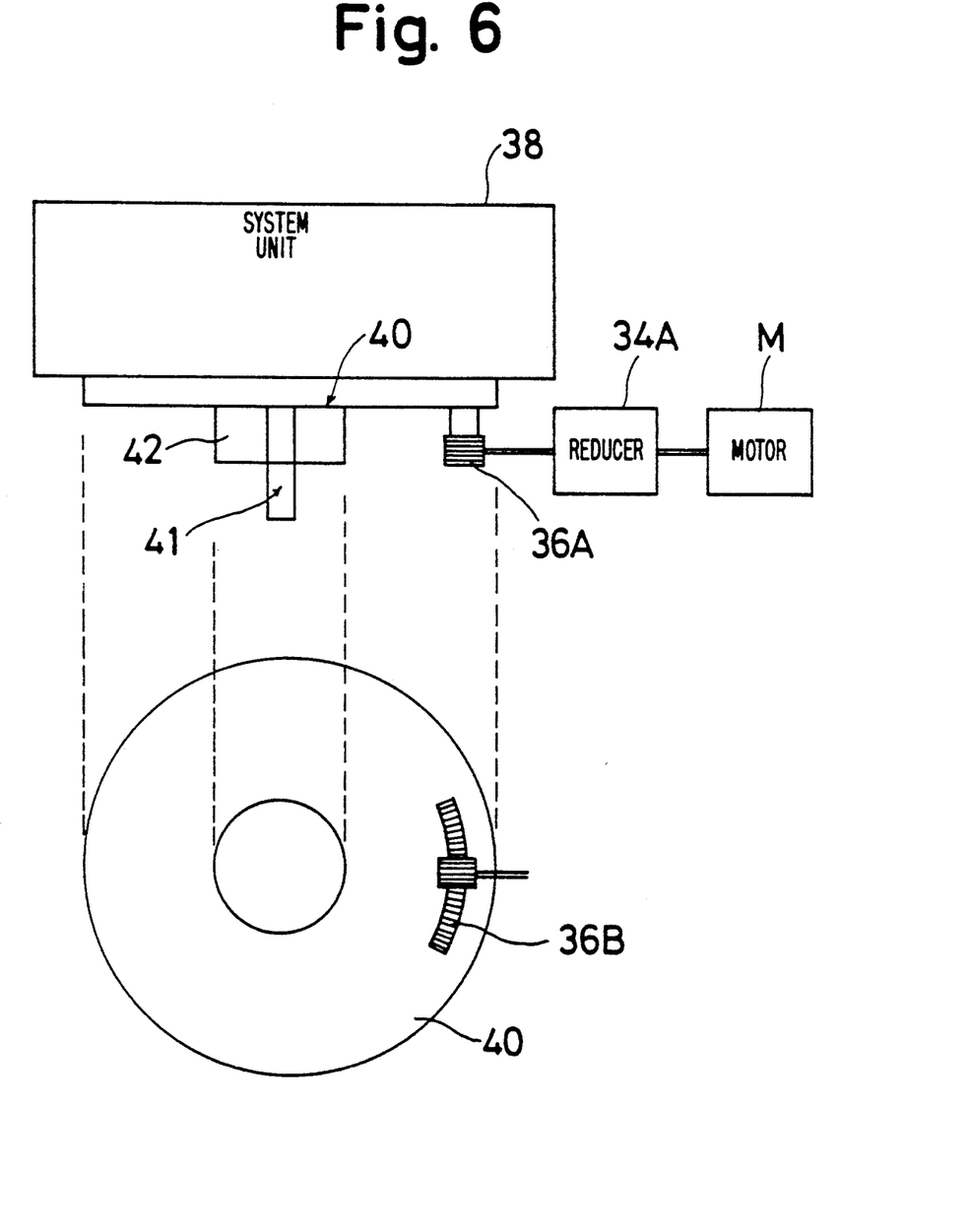
FIG. 6 is an illustration showing a mechanism for rotating a system unit.
Figure 7:
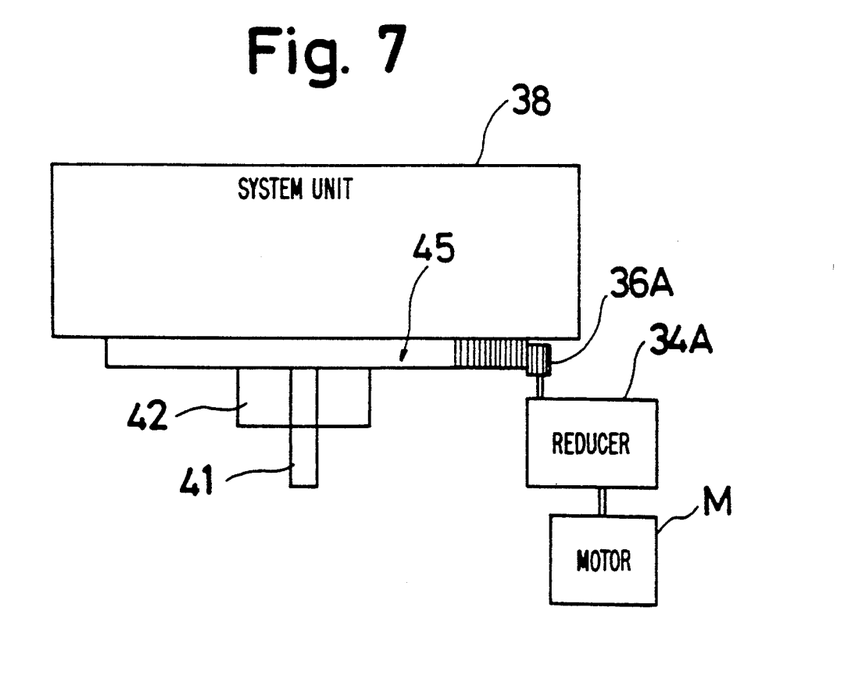
FIG. 7 is an illustration showing another mechanism for rotating a system unit.
Figure 8:
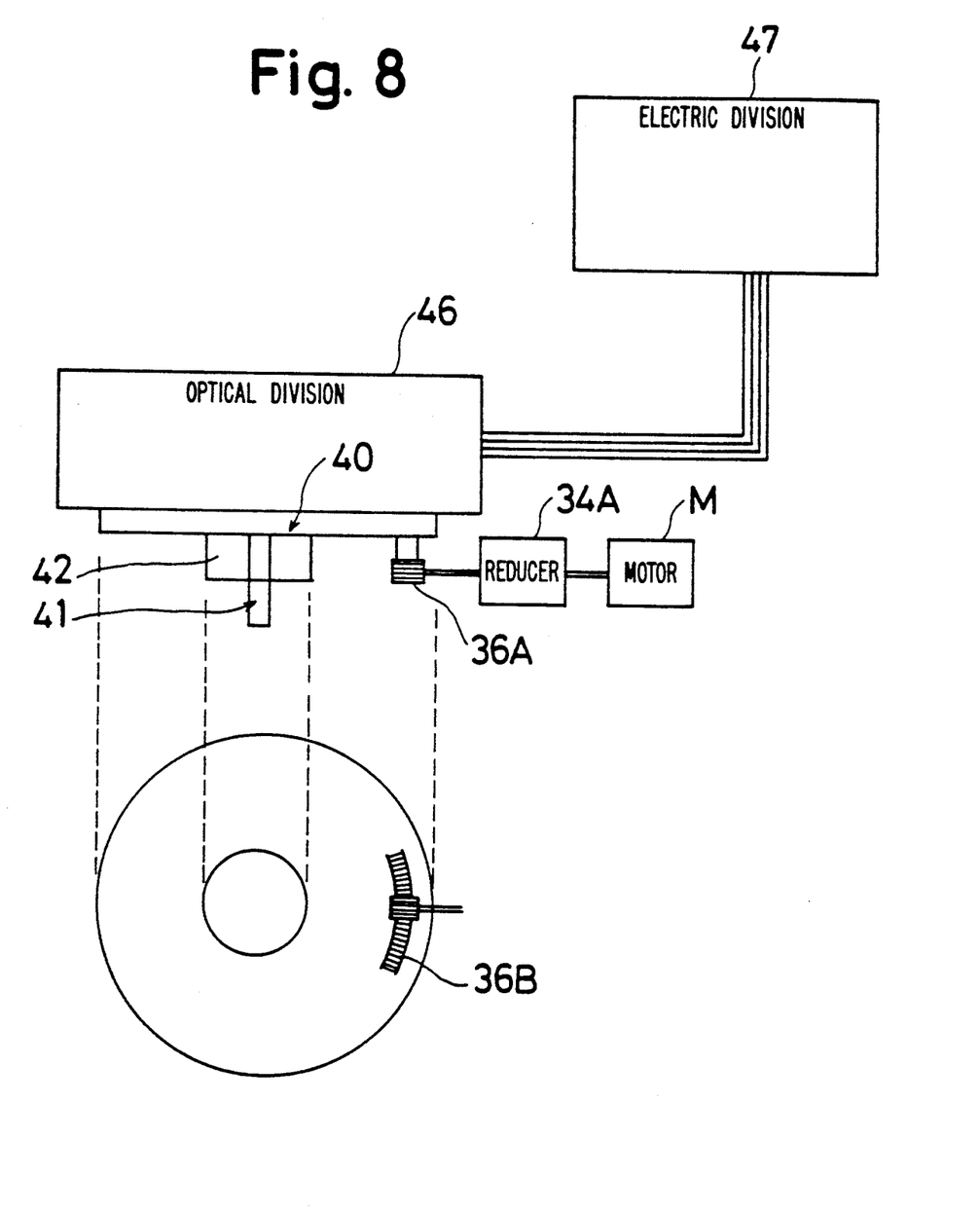
FIG. 8 is an illustration showing a third type mechanism for rotating a system unit.

As shown in FIG. 6, the motor M is connected to a reducer 34A having a shaft on which a pinion 36A is fixed. The pinion 36A is in meshing engagement with an annular rack 36B which is secured to a bottom surface of a base plate 40. The base plate 40 is provided with a shaft 41 which is rotatably mounted on a portion 42 of the vehicle body. On the plate 40, there is mounted a system unit 38 which includes, as shown in FIG. 3, a plate 43 for retaining the laser diodes LD1, LD2, and LD3, and a convex lens 44 aiming at the obstacle 90. The plate 43, the laser diodes LD1–LD3 constitute an optical unit. In the system unit 38, other electric components are also accommodated. The relationship between the emission direction and the rotational direction of the system unit 38 in FIG. 5. Instead of the plate 40 and the annular rack 40, a worm wheel 45 is available as shown in FIG. 7. In addition, the system unit 38 shown in FIG. 6 can be divided into an optical division 46 and an electric division 47 as shown in FIG. 8. In the optical division 46, the laser diodes LD1, LD2, LD3, and the photodiode 18A are accommodated. In the electric division 47, other electric components are accommodated. Such structure will reduce the load of the motor M due to the fact that the mass of each member to be driven by the motor M is reduced.

Figure 4:
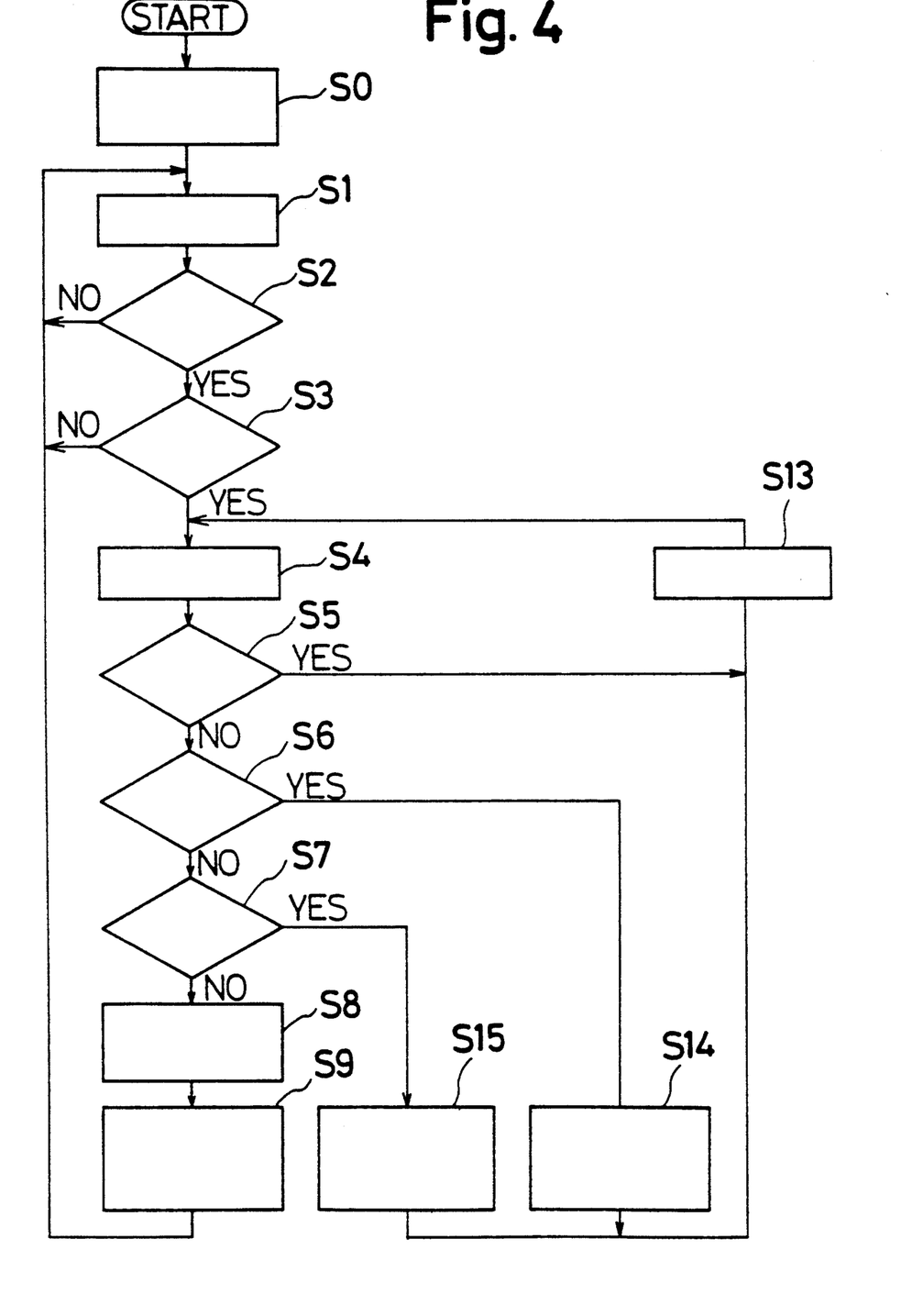
FIGS. 4 is a flowchart showing the control of the rotating direction of a prime axis of a laser beam.

The system 10 is set to be operated in order that the obstacle 90 is to be detected by the laser beam emitted from the second laser diode LD2 in accordance with a control based on a flowchart shown in FIG. 4.

First of all, at step S0, the motor M is ready for rotation. At step S1, laser beams are emitted from the laser diodes LD1, LD2, and LD3 in turn at an interval. At step S2, if the result of the operation at step S1 is deemed not to be any one of mode 3, mode 4, mode 7, and mode 8 (i.e. the laser beam emitted from the second laser diode LD2 is not received at the photodiode 18A as the reflected beam), the control is returned to step S1. If any one of mode 3, mode 4, mode 7, and mode 8 is recognized at step S2, it is checked at step S3 whether or not the locking indication signal is fed by which the motor M is remained unchanged. If positive answer is obtained at step S3, at steps S4 and S5, processings similar to those at steps S1 and S2 are performed. respectively. If negative answer is obtained at step S3, the control is returned to step S1. If the answer at step S5 is positive, the step S4 is set to be performed after execution of step S13 at which the locking signal is so generated as to show that the obstacle 90 is applied with the laser beam from the second laser diode LD2 or both of the laser beams from first and third laser diodes LD1 and LD3. When the answer at step S5 is negative, at step S6, it is checked whether the condition is mode 2 or not. If positive answer is obtained, the obstacle 90 is deemed to be at a front-right side relative to this vehicle, and at step S14 the plate 43 is rotated through an angle $\Delta\theta$ in one direction to chase the obstacle 90 by driving the motor M in normal direction. If negative answer is obtained at step S6, step S7 is performed whether mode 5 is detected or not. In case of positive answer, the obstacle 90 is deemed to be at a front-left side relative to this vehicle, and at step S15 the plate 43 is rotated through an angle $\Delta\theta$ in the other direction to chase the obstacle 90 by driving the motor M in reverse direction. In case of negative answer at step S7, the condition is found to be mode 1 wherein the obstacle 90 is deemed to be out of the beam range or not to be in existence. Thus, at step S9, the generation of the locking indication signal is terminated, and at step 8, the plate 43 is returned to its initial or original position by driving the motor M.

In summary, the rotation of the prime axis of the combined beam or the plate 43 in relation to each mode is shown in the following Table 2.

TABLE 2

| Mode | Rotational direction of the prime axis of the combined beam |
|---|---|
| 1 | Returning to its original or initial position |
| 2 | Rightward direction |
| 3 | Remained unchanged |
| 4 | Remained unchanged |
| 5 | Leftward direction |
| 6 | Remained unchanged |
| 7 | Remained unchanged |
| 8 | Remained unchanged |

It is to be noted that the maximum rotation angle of the prime axis of the combined beam or the plate 43 is $\pm\theta_{ma4}$ as shown in FIG. 2.

Figure 9:
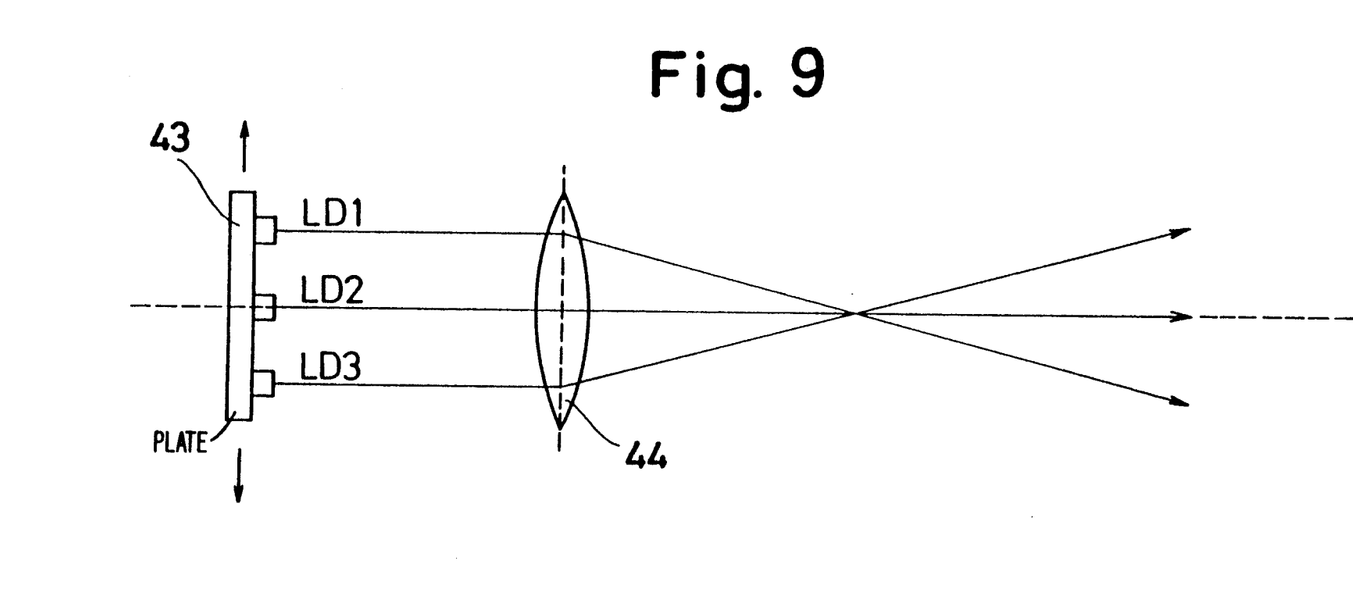
FIG. 9 is a plane view showing another mode of a scanning manner of laser beams.
Figure 10:
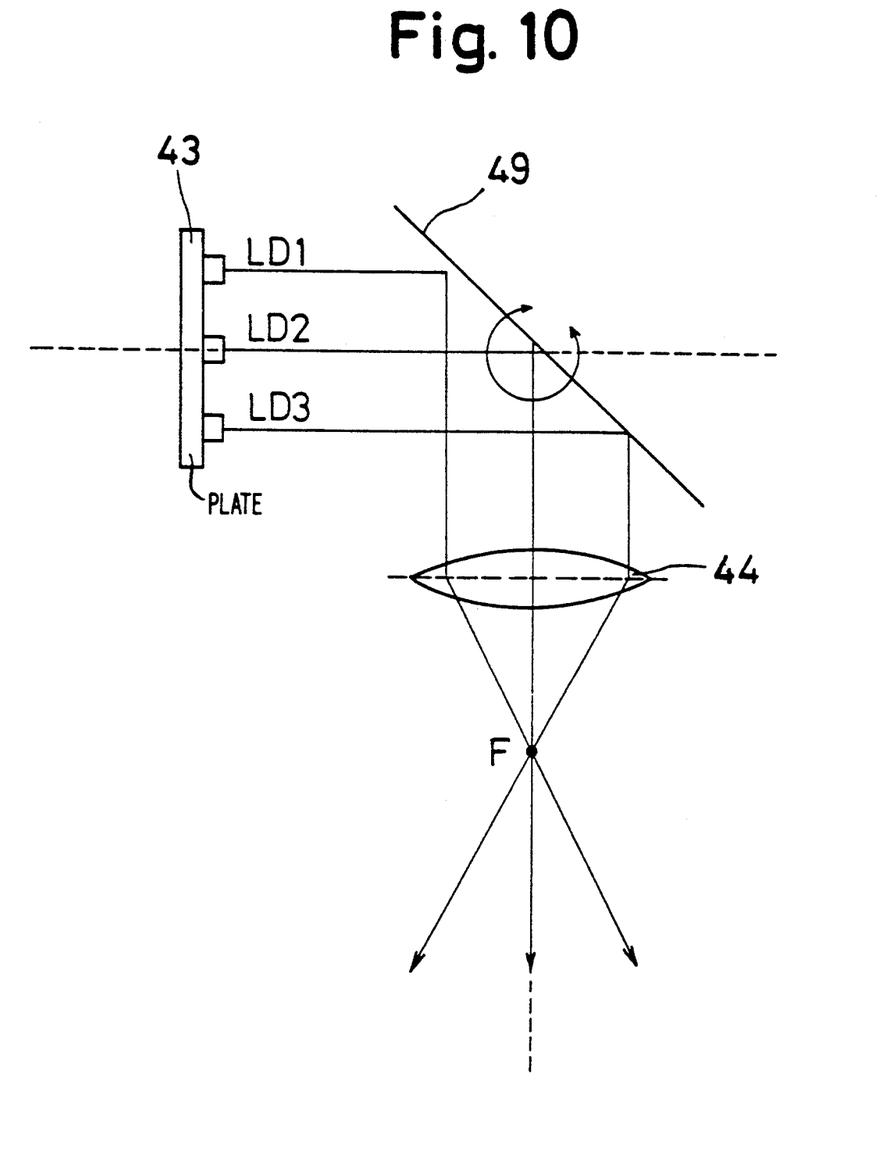
FIG. 10 is a plane view showing a third mode of a scanning manner of laser beams.

As shown in FIG. 9, instead of the rotation of the plate 43, the plate 43 can be moved in the width direction of the vehicle body. Furthermore, as shown in FIG. 10, a structure is also available wherein a rotatable mirror 49 is positioned between the convex lens and the plate 43 to laser diodes LD1–LD3.

As mentioned above in detail, since the system 10 is provided with at least three laser diodes in the present invention, the system per se can detect the moving direction of the obstacle such as the preceeding vehicle. That is to say, at least one of the laser beams emitted from the laser diodes can be applied to the obstacle, which enables the successful or reliable chasing thereof.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An optical detecting system, said system mounted on a vehicle and detecting the position of a preceding vehicle, said system comprising:

an optical unit including three laser diodes, said diodes emitting a laser beam in a forward direction relative to the vehicle, said laser diodes spaced in a lateral direction relative to the vehicle and positioned so as to emit two laterally outward beams and a central beam;

a convex lens spaced from and located forwardly of said laser diodes, said lens expanding the beams so as to increase the lateral distance between the outermost extent of the two laterally outward beams;

receiving means for receiving a reflection of the laser beams from a preceding vehicle; and driving means for causing rotation in a generally horizontal plane of the positions of the expanded beams so as to cause said optical detecting system to follow a preceding vehicle, wherein, when the positions of the expanded beams are rotated, the lateral distance between the outermost extent of the two laterally outward beams remains substantially unchanged.

2. The system recited in claim 1, wherein, when said receiving means receives a reflection of only one beam and the one beam is emitted by one of the laterally outward diodes, said driving means operates to rotate the positions of the expanded beams such that the central beam rotates towards the beam which was reflected.

3. The system recited in claim 1, wherein, when said receiving means receives a reflection of the beams emitted by both of said laterally outward diodes, said driving means does not operate to rotate the positions of the expanded beams.

4. The system recited in claim 1, wherein, when said receiving means receives a reflection of the beam emitted by the central diode, said driving means does not operate to rotate the positions of the expanded beams.

5. The system recited in claim 1, wherein, when said receiving means does not receive a reflection of any of the beams emitted by the diodes, said driving means operates to rotate the positions of the expanded beams back to an initial position.

6. The system recited in claim 1, said driving means causing joint rotation of both said optical unit and said convex lens in order to rotate the positions of the expanded beams.

7. The system recited in claim 1, said driving means causing said optical unit to move in a direction substantially parallel to the prime axis of said convex lens.

8. The system recited in claim 1, said driving means comprising a mirror disposed between said optical unit and said convex lens, said mirror reflecting the emitted laser beams towards said convex lens, rotation of said mirror causing rotation of the positions of the expanded beam.

9. The system recited in claim 1, wherein, said optical unit is mounted at a forward location on a vehicle.

10. The system recited in claim 1, wherein, said laser diodes are equally spaced.

11. The system recited in claim 1, said optical unit further comprising a plate on which said laser diodes are mounted.

12. An optical detecting system, said system mounted at a forward location on a tracking vehicle and detecting and tracking the position of a preceding road vehicle which is forward of the tracking vehicle, said system comprising:

an optical unit including three laser diodes, said diodes each emitting a laser beam in a forward direction relative to the tracking vehicle, said laser diodes spaced in a lateral direction relative to the tracking vehicle and positioned so as to emit two laterally outward beams and a central beam;

a convex lens spaced from and located forwardly of said laser diodes, said lens expanding the beams such that the expanded beams extend across substantially adjacent areas, said substantially adjacent areas jointly defining a combined beam area having a predetermined extent at a given distance from said convex lens;

receiving means for receiving a reflection of the laser beams from a preceding vehicle; and tracking means for causing joint rotation about a substantially vertical axis of the positions of the expanded beams such that the position of the combined beam area is rotated about a substantially vertical axis, the combined beam area rotated so as to track the preceding vehicle.

13. The system recited in claim 12, said tracking means including means for jointly rotating said diodes and said convex lens.

14. The system recited in claim 12, said tracking means including means for causing said diodes to move in a plane which is substantially perpendicular to the optical axis of said convex lens.

15. The system recited in claim 12, said tracking means including a rotatable mirror disposed in the path of laser beams between said diodes and said convex lens.

* * * * *